United States Patent [19]

Kita et al.

[11] Patent Number: 4,590,316

[45] Date of Patent: May 20, 1986

[54] METHOD OF SAFELY PREPARING GRAPHITE FLUORIDE

[75] Inventors: Yasushi Kita; Hisaji Nakano; Shiro Moroi; Akira Sakanoue, all of Ube, Japan

[73] Assignee: Central Glass Company, Limited, Ube, Japan

[21] Appl. No.: 650,986

[22] Filed: Sep. 14, 1984

Related U.S. Application Data

[63] Continuation of Ser. No. 449,588, Dec. 14, 1982.

[30] Foreign Application Priority Data

Dec. 17, 1981 [JP] Japan ............................ 56-202564

[51] Int. Cl.$^4$ ............................................. C07C 17/00
[52] U.S. Cl. .................................................... 570/150
[58] Field of Search ........................ 570/150, 152, 173

[56] References Cited

U.S. PATENT DOCUMENTS 2,664,449 12/1953 Miller ................................. 570/173
3,925,492 12/1975 Ukaji et al. ......................... 570/150
3,929,918 12/1975 Meshri et al. ...................... 570/150
3,929,920 12/1975 Komo et al. ....................... 570/150

Primary Examiner—Charles F. Warren
Assistant Examiner—Joseph A. Boska
Attorney, Agent, or Firm—Fleit, Jacobson, Cohn & Price

[57] ABSTRACT

A method of preparing graphite fluoride such as $(CF)_n$ or $(C_2F)_n$ by heterogeneous contact reaction between a carbon material such as graphite or petroleum coke and fluorine gas at about 200°–550° C. In the gas phase of the reaction system, the total concentration of higher fluorocarbons having more than four carbon atoms formed by side reactions is controlled so as not to become above 3% by volume by, for example, condensation or catalytic decomposition of at least a portion of the higher fluorocarbons in the gas flowed out of the reaction chamber for recirculation. Such control is highly effective for prevention of rapid and violent decomposition of the graphite fluoride existing in the solid phase of the reaction system induced by sudden decomposition of the higher fluorocarbons in the reaction system to lower fluorocarbons.

11 Claims, No Drawings

METHOD OF SAFELY PREPARING GRAPHITE FLUORIDE

This application is a continuation of application Ser. No. 449,588, filed Dec. 14, 1982.

BACKGROUND OF THE INVENTION

This invention relates to a method of preparing graphite fluoride by an eterogeneous contact reaction between solid carbon and fluorine gas, and more particularly to an improvement in the safety and reproducibility of the reaction.

Graphite fluoride or poly(carbon monofluoride) having the chemical structure expressed by $(CF)_n$, is a stable solid compound which can be prepared by a heterogeneous contact reaction between carbon and fluorine gas. As is known this compound is very low in surface energy and has been valued in various industries as a superior material for lubricants, water- and oil-repellents, anti-wetting agents, anti-contamination agents, activating agents for certain electrolytic cells, etc. Recently graphite fluoride of another type, i.e., poly(dicarbon monofluoride), expressed by $(C_2F)_n$, has also acquired great and increasing interest for generally similar aspects. Since the demand for such graphite fluorides is rapidly increasing, it has become a matter of importance and urgency to develop an industrially practicable and favorable method for large-scale production of graphite fluorides.

Generally the aforementioned reaction to form graphite fluoride $(CF_x)_n$, where $0<x<1.3$, is expressed by the following equation.

$$nC + \frac{nx}{2} F_2 \longrightarrow (CF_x)_n \quad (1)$$

In practice, however, some side reactions take place as the reaction of Equation (1) proceeds. The side reactions are represented by the following equations:

$$C + F_2 \rightarrow CF_4, C_2F_6, \text{etc.} \quad (2)$$

$$(CF_x)_n \rightarrow C + CF_4, C_2F_6, \text{etc.} \quad (3)$$

The reaction of Equation (3) is the decomposition of the graphite fluoride formed by the intended reaction (1). Since the reactions (1) and (2) are both exothermic, the cause of the reaction (3) has been presumed to be the accumulation of the heat of formation of graphite fluoride by the reaction (1), augmented by the heat of the reaction (2), in the mixture of the formed graphite fluoride and the unreacted portion of the carbon material, and the consequential rise in the temperature of the mixture beyond the decomposition temperature of the graphite fluoride. In many cases, the decomposition reaction (3) is greatly promoted in a very short time with generation of a large amount of heat and large amounts of gaseous fluorocarbons, and results in explodingly rapid and violent decomposition of the entire graphite fluoride in the reaction system. In such cases it is impossible to obtain the intended product, graphite fluoride. Moreover, sometimes the reaction vessel is significantly damaged by the explosive decomposition of the graphite fluoride.

On the aforementioned presumption, it has been preventing the decomposition reaction of Equation (3) by preventing accumulation of heat in the solid phase of the reaction system according to Equation (1) has been tried. The proposals made heretofore in this regard include dilution of fluorine gas for the reaction of Equation (1) with a certain gas, e.g. $CF_4$, to lower the rate of the reaction (1) and suppress the side reaction (3), limitation of the reaction temperature, and the use of a multi-stage fluorination apparatus.

However, we have recognized that almost instantaneous decomposition of the formed graphite fluoride often takes place even when the heat of reaction is effectively dissipated so that the temperature of the solid phase of the reaction system exhibits little rise.

SUMMARY OF THE INVENTION

It is an object of the present invention to provide an improved method of preparing graphite fluoride by heterogeneous contact reaction between solid carbon and fluorine gas, by which method the intended reaction can be completed without suffering from significant decomposition of the formed graphite fluoride.

This invention provides a method of preparing a graphite fluoride a heterogeneous contact reaction between a solid carbon material and a gas containing fluorine gas, and the improvement by the invention resides in controlling the total concentration of higher fluorocarbons having more than four carbon atoms in the gas phase of the reaction system such that the total concentration of the higher fluorocarbons does not exceed 3% by volume, and most preferably, does not exceed 1% key volume.

The method according to the invention is suitable for the preparation of either $(CF)_n$ or $(C_2F)_n$, and more broadly for the preparation of a graphite fluoride expressed generally by $(CF_x)_n$, where $0<x<1.3$.

As the basis of this invention, we have confirmed that the formation of graphite fluoride by the reaction of Equation (1) is practically always accompanied by formation of some higher fluorocarbons by side reactions represented by Equation (2), and discovered that the presence of considerable amounts of higher fluorocarbons, and particularly ones having more than four carbon atoms, in the gas phase of the reaction system is an important cause of the often experienced rapid decomposition of the graphite fluoride in the solid phase of the reaction system.

Our experimental studies revealed that the products of the side reactions represented by Equation (2) are not limited to lower fluorocarbons such as $CF_4$ and $C_2F_6$ and include various kinds of higher fluorocarbons some of which have more than ten carbon atoms. By analysis we have confirmed the formation of the following fluorocarbons: $CF_4$, $C_2F_6$, $C_3F_8$, $C_4F_{10}$, $C_5F_{10}$, $C_5F_{12}$, $C_6F_{12}$, $C_6F_{14}$, $C_7F_{14}$, $C_7F_{16}$, $C_8F_{16}$, $C_8F_{18}$, $C_9F_{18}$, $C_9F_{20}$, $C_{10}F_{20}$, $C_{10}E_{22}$, $C_{11}F_{22}$, $C_{11}F_{24}$, $C_{12}F_{24}$ and $C_{12}F_{26}$.

The existence of higher fluorocarbons, particularly ones having five or more carbon atoms, in the gas in the reaction vessel is an unexpected fact because in fluorine gas the decomposition of such higher fluorocarbons to lower fluorocarbons typified by $CF_4$ is a thermodynamically probable way of change. For example, in the reaction of the following equation (4) the change in free energy $\Delta G$ amounts to $-150.8$ Kcal/mol (300° C.).

$$C_2F_6 + F_2 \rightarrow 2CF_4 \quad (4)$$

In view of this fact, we presumed that the higher fluorocarbons existing in fluorine gas might be in a metastable state and therefore would readily decompose to lower fluorocarbons upon receipt of some energy in certain form such as heat, agitation or mechanical shock or upon contact with a catalytically active fluoride such as $CoF_3$ or $FeF_3$, and this presumption was proved correct by our subsequent experimental studies. Moreover, we have discovered that, when the total concentration of higher fluorocarbons having more than four carbon atoms in the gas phase of the reaction system according to Equation (1) is above 3% by volume, even a small shock to the gas phase causes explosively rapid decomposition of such higher fluorocarbons to lower fluorocarbons, mostly $CF_4$, that the tendency to decomposition of the higher fluorocarbons remains unchanged even when a diluted fluorine gas is used for the reaction of Equation (1), and that the energy liberated by the rapid decomposition of the higher fluorocarbons induces the decomposition of an entire quantity of the graphite fluoride present in the solid phase of the reaction system.

In other words, we have discovered and confirmed that the sudden decomposition of graphite fluoride during preparation of graphite fluoride by using the reaction of Equation (1) can surely be prevented by taking certain measures for preventing the total concentration of the higher fluorocarbons in the gas phase of the reaction system from exceeding 3% by volume. The present invention has made it possible to surely and safely prepare an intended graphite fluoride in an industrial scale by making an easily practicable modification to known processes of forming graphite fluoride by heterogeneous contact reaction between solid carbon and fluorine gas.

DESCRIPTION OF THE PREFERRED EMBODIMENTS

In the practice of the present invention, the required control of the total concentration of higher fluorocarbons (having more than four carbon atoms) in the gas phase of the reaction system can be performed in various ways. For example, where fluorine gas or diluted fluorine gas is circulated in the reactor for preparation of graphite fluoride, it is possible to effectively decrease the higher fluorocarbons, which are relatively high in boiling point, by forcibly passing the gas flow out of the reaction chamber through a trap provided at a suitable location in the gas recirculation line and cooled for condensation of the higher fluorocarbons by using, for example, methanol and dry ice. It is also possible to decrease the higher fluoro-carbons, in the gas by using a catalyst, e.g., certain metal fluorides, such as $CoF_3$ or $FeF_3$, which cause the higher fluorocarbons to gradually and mildy decompose to lower fluorocarbons. Where fluorine gas or diluted fluorine gas is confined in the reaction chamber for prepant ion of graphite fluoride without performing forcible circulation of the gas, it is possible to control the total concentration of the higher fluoro-carbons in the gas by gradually discharging a portion of the gas from the reaction chamber either continuously or at suitable intervals as the reaction proceeds.

Under the usual reaction conditions employed in the preparation of graphite fluoride by reaction between solid carbon and fluorine gas, which may be diluted with a suitable gas, the object of the present invention can be achieved by decreasing higher fluorocarbons having more than four carbon atoms present in the gas phase of the reaction system such that the total concentration of the higher fluorocarbons in the gas does not become higher than 3% by volume. In view of the fact that the explosion limit and the range of explosion of the higher fluorocarbons in the gas phase of the reaction system are variable, as is usual in many other combustible gases, depending on various factors including the gas temperature and the concentration of the coexisting gaseous fluorine, it is desirable that the total concentration of the higher fluorocarbons in the reacting gas be as low as possible, and therefore it is preferred to perform the control according to the invention such that the total concentration of the higher fluorocarbons in the gas does not exceed 1% by volume.

The fundamental concept of the present invention is applicable to any one of the conventional processes for the preparation of graphite fluoride, either batchwise processes or continuous processes.

There is no particular limitation on the kind or type of carbon material for use in the method according to the invention, and either amorphous carbon or crystalline carbon can be used. Natural graphite, synthetic graphite, petroleum coke, carbon black and activated carbon can be named as typical examples of practical carbon materials. As to the physical form of the carbon material, a sole requirement is that the carbon material should be divided into relatively small pieces, usually into pieces smaller than about 10 mm or into more smaller particles.

It is possible to use practically pure fluorine gas of any origin. However, it is more favorable for control of the rate of reaction to use a diluted fluorine gas containing, for example, 30–50% of an inactive gas such as nitrogen or helium.

The reaction temperature may variously be determined depending on the kind and physical form of the carbon material and also on the chemical structure of the graphite fluoride to be formed. In general a suitable range of the reaction temperature is from about 200° C. to about 550° C. If desired, the graphite fluoride formed in a reaction vessel can be crystallized by raising the temperature in the reaction vessel up to about 600° C. after completion of the fluorinating reaction.

The method of the invention will be illustrated by the following nonlimitative examples.

EXAMPLE 1

Fluorination of synthetic graphite was performed in a reactor of tray-and-compartment type having a horizontally elongate cylindrical outer wall provided with heater. The reactor was 300 mm in inner diameter and 1000 mm in length. In the interior of the reactor and spaced from the cylindrical outer wall, there was a reaction vessel defining therein a reaction chamber rectangular in vertical cross section. The side walls of the inner reaction vessel were provided with brackets to support tray-like material containers inserted into the reaction chamber in the manner of three-decker shelves. The reactor was provided with a gas circulation line including ducts and fans arranged so as to circulate fluorine gas through the space between the cylindrical outer wall and the inner reaction vessel, through the spaces left in the reaction chamber along the three material containers and through an external duct. To remove higher fluorocarbons contained in the fluorine gas flowed out of the reaction chamber, a trap using methanol and dry ice was provided to the external duct in the gas circulation line.

As the raw material, 1 kg of granular synthetic graphite was put into each of the three tray-like containers which were placed in the reactor. A diluted fluorine gas consisting of 60% by volume of fluorine gas prepared by a usual electrolysis method and 40% by volume of nitrogen gas was introduced into the reactor and forced to circulate in the above described manner at a nearly constant flow rate of 20 liters per hour so as to maintain the gas pressure in the reaction chamber at 1 atm. Continuing the circulation of the diluted fluorine gas, the temperature in the reaction chamber was maintained at 350°–400° C. for 80 hr. During this period there was no perceptible indication of decomposition of the product of reaction between graphite and fluorine gas.

As the result, the synethetic graphite in the three containers were fluorinated to graphite fluoride $(C_2F)_n$ which weighed 6.3 kg in total. During the fluorination process the gas flow out of the reaction chamber was subjected to gas chromatography at suitable intervals to measure a total concentration of higher fluorocarbons having more than four carbon atoms in the gas, and it was found that the total concentration of such fluorocarbons was always below 0.5% by volume. After completion of the fluorination process about 20 g of fluorocarbons (mostly $C_7$ and $C_8$ fluorocarbons) that are liquid at room temperature, and some low boiling point fluorocarbons such as $C_2F_6$, were found to have been trapped in the aforementioned trap in the gas circulation line.

EXAMPLE 2

Using the apparatus and the diluted fluorine gas described in Example 1, the synthetic graphite used in Example 1 was fluorinated at 350°–400° C. In this case, however, the gas circulation line was not used so that the fluorine gas was confined in the reactor.

It was found that the concentrations of lower and higher fluorocarbons in the fluorine gas in the reaction chamber increased with the lapse of reaction time, and that higher fluorocarbons having more than four carbon atoms were formed at a rate of about $7.5 \times 10^{-4}$ mole/hr in total. After the lapse of 20 hr from the start of the reaction the total concentration of such higher fluorocarbons in the gas in the reaction chamber reached 1% by volume. Thereafter a portion of the gas was continuously discharged from the reactor at a constant and relatively low rate of 30 ml/min to thereby maintain the total concentration of the higher fluorocarbons in the gas in the reaction chamber at the level of 1% by volume, and the heating of the reaction system was continued for an additional 60 hr. During the total period of 80 hr there was no perceptible indication of decomposition of the product of reaction between graphite and fluorine gas. Obtained as the result was 6.3 kg of graphite fluoride $(C_2F)_n$.

REFERENCE

The process of Example 2 was repeated almost identically, except that no portion of the fluorine gas was discharged from the reactor even after the lapse of 20 hr from the start of the reaction. Naturally the total concentration of the higher fluorocarbons in the gas in the reaction chamber continued to increase with the lapse of time.

After the lapse of 72 hr from the start of the reaction, there occurred a sharp rise in the gas pressure in the reactor which resulted in the rupture of a rupture disc provided an the reactor as a safety device. It was found that the cause of the pressure rise was instantaneous decomposition of the entire amount of graphite fluoride formed by the fluorination reaction. Immediately before this accident, the total concentration of the higher fluorocarbons in the gas in the reaction chamber was 3.1% by volume.

EXPERIMENT

An experiment was carried out to estimate the range of explosion of a mixed gas containing a relatively large amount of fluorine gas and small amounts of higher fluorocarbons.

Using the mixture of higher fluorocarbons (mostly $C_7$ and $C_8$ fluorocarbons) trapped during the fluorination process of Example 1, a mixed gas consisting of 80% by volume of fluorine, 18.5% by volume of nitrogen and 1.5% by volume of higher fluorocarbons was carefully prepared. The mixed gas was confined in a precedingly evacuated cylindrical vessel, which was 50 mm in inner diameter and 300 mm in length and had a safety device to prevent rupture upon excessive rise in the inner pressure. The vessel was heated so as to raise the temperature of the confined gas up to 500° C., but no change or unusual phenomenon was observed in the vessel. Then the heated vessel was hammered to give mechanical shocks to the gas confined therein, but still no change was observed. Accordingly the 1.5% by volume content of higher fluorocarbons in a diluted fluorine gas can be taken as outside of the range of explosion under the tested conditions.

Another mixed gas consisting of 60% by volume of fluorine, 36% by volume of nitrogen and 4% by volume of the aforementioned mixture of higher fluorocarbons (mostly $C_7$ and $C_8$) was subjected to the same test. The heating of the vessel to raise the temperature of the confined gas up to 500° C. produced no perceptible change in the vessel. However, hammering of the heated vessel resulted in actuation of the safety device of the vessel with a loud noise and a sudden rise in the temperature of the vessel by 50° C. It was confirmed that the main component of the gas remaining in the vessel was $CF_4$. The result of this test teaches that the 4% by volume content of higher fluorocarbons in a diluted fluorine gas is certainly within the range of explosion under the tested conditions and that the exploding decomposition of the higher fluorocarbons will arouse rapid and violent decomposition of coexisting graphite fluoride.

What is claimed is:

1. In a method of preparing a graphite fluoride by heterogeneous contact reaction between a solid carbon material in finely divided form and a gas comprising a mixture of 50-70% by volume of fluorine gas and 30-50% by volume of another gas which is inactive to said carbon material, the method having the steps of:

placing said carbon material in a reaction zone of a reactor;

introducing said gas into said reaction zone while said carbon material is kept heated such that said gas flows through said reaction zone and contacts and reacts with said carbon material;

allowing said gas to flow out of said reaction zone and recirculating said gas through said reaction zone, wherein gaseous higher fluorocarbons having more than 4 carbon atoms are formed in the gas phase in said reaction zone during the reaction, the improvement comprising the steps of:

(a) measuring at intervals the totals concentration of said gaseous higher fluorocarbons in the gas flowed out of said reaction zone; and (b) removing at least a portion of said gaseous higher fluorocarbons from the gas flowed out of said reaction zone prior to the recirculation of said gas so as to control the total concentration of said gaseous higher fluorocarbons in said gas phase and to maintain the total concentration of said gaseous higher fluorocarbons in said gas phase at or less than 3% by volume to thereby prevent violent decomposition of graphite fluoride which is formed by the reaction and exits in the reaction zone.

2. A method according to claim 1, wherein the reaction zone is kept heated at temperatures in the range of from 200° to 550° C.

3. A method according to claim 2, wherein said carbon material is selected from the group consisting of natural graphite, synthetic graphite, petroleum coke, carbonblack and activated carbon.

4. A method according to claim 2, wherein the total concentration of gaseous fluorcarbons in the reaction zone is controlled and maintained at or less than 1% by volume.

5. A method according to claim 2, wherein the step of removing at least a portion of said gaseous higher fluorocarbons from the gas flowed out of said reaction zone prior to the recirculation of said gas is accomplished by passing the gas flowed out of said reaction zone through a cooled trap to thereby condense at least portion of said gaseous higher fluorocarbons contained in the gas flowed out of said reaction zone proir to the recirculation thereof.

6. A method according to claim 2, wherein the step of removing at least a portion of said gaseous higher fluorocarbons from the gas flowed out of said reaction zone prior to the recirculation of said gas is accomplished by forcing the gas flowed out of said reaction zone to contact a catalyst capable of causing decomposition of at least a portion of said gaseous higher fluorocarbons to lower fluorocarbons having not more than 4 carbon atoms.

7. A method according to claim 6, wherein said catalyst is a metal fluoride selected from the group consisting of $CoF_3$ and $FeF_3$.

8. In a method of preparing a graphite fluoride by heterogeneous contact reaction between a solid carbon material in a finely divided form and a gas comprising a mixture of 50–70% of fluorine gas and 30–50% by volume of another gas which is inactive to said carbon material, the method having the steps of:

placing said carbon material in a reaction zone of a reactor; and introducing said gas into said reaction zone and substantially confining said gas in said reaction zone while said carbon material is kept heated such that said gas contacts and reacts with said carbon material, wherein gaseous higher fluorocarbons having more than 4 carbon atoms are formed in the gas phase in said reaction zone during the reaction, the improvement comprising the steps of:

(a) measuring at intervals the total concentration of said gaseous higher fluorocarbons in the gas phase; and (b) gradually discharging a portion of the gas existing in said reaction zone from said reaction zone as the reaction proceeds so as to control the total concentration of said gaseous higher fluorocarbons in said gas phase and maintain said gaseous higher fluorocarbons in said gas phase at or less than 3% volume thereby preventing violent decomposition of graphite fluoride which is formed by the reaction and exists in said reaction zone.

9. A method according to claim 8, wherein the reaction zone is kept heated at temperatures in the range of from 200° to 550° C.

10. A method according to claim 8, wherein said carbon material is selected from the group consisting of natural graphite, synthetic graphite, petroleum coke, carbon black and activated carbon.

11. A method according to claim 8, wherein the total concentration of gaseous higher fluorcarbons in the reaction zone is controlled and maintained at or less than 1% by volume.

* * * * *